United States Patent Office 3,525,648
Patented Aug. 25, 1970

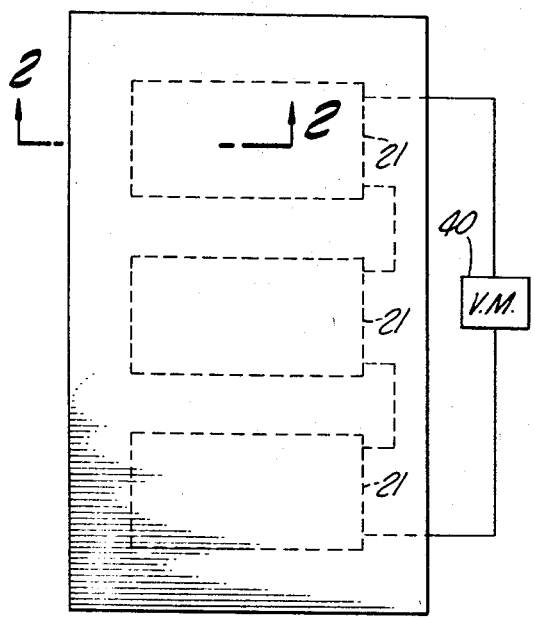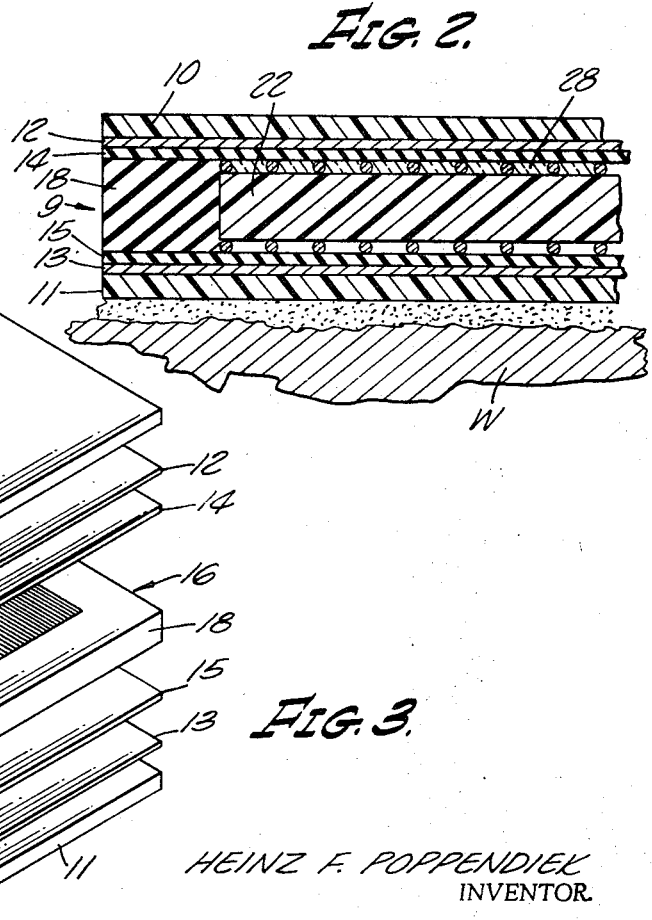

3,525,648
THERMOELECTRIC HEAT FLOW
RESPONSIVE DEVICE
Heinz Frank Poppendiek, La Jolla, Calif., assignor to The
Regents of the University of California, Berkeley,
Calif.
Continuation of application Ser. No. 579,672, Sept. 15,
1966. This application Jan. 12, 1968, Ser. No. 709,155
Int. Cl. H01v 1/00
U.S. Cl. 136—226         3 Claims

ABSTRACT OF THE DISCLOSURE

A heat flow meter in which a plurality of turns of high melting point wire such as platinum is wound around an alumina plate with each of the turns having a portion thereof coated with a high melting point metal such as nickel, iron, or molybdenum to form a thermopile having a series of thermocouples lying on each side of the alumina plate. Leads are connected to the terminals of the thermopile structure and a vitreous glaze covers the wires coating and at least a portion of the terminals. The alumina plate is disposed between two insulating plates and each of such insulating plates has a heat conducting metal cover plate sealed thereto for heat diffusion and insulating means in the form of plates covers the metal cover plates.

---

The present application is a continuation of my U.S. patent application Ser. No. 579,679 filed Sept. 15, 1966 and is assigned to the same assignee.

The present invention relates to means and techniques useful in determining or measuring heat flow and, in general, pertains to improvements in the construction, functioning and results accomplished in the use of meters of the character described in United States Letters Patent 2,493,651 issued Jan. 3, 1950 to Llewellyn M. K. Boelter et al. which is assigned to the same assignee as the present application.

The present application describes a heat flow meter together with improved means for coupling the same in a heat transfer sense to the regular walls, surfaces or other sources or heat sinks for purposes of accurately measuring the steady state, transient or periodic heat flow into or out of such walls, surfaces or other sources or sinks. For these purposes the new heat flow meter or transducer described herein incorporates new structural features whereby more accurate and reproducible readings or determinations are produced.

It is desirable that devices of this character accurately average nonuniform heat flux distributions and following the prior art teachings this would entail the use of very many closely spaced thermopiles in the sensing surface. However, it is not only impractical to use a large number of thermopiles, but also the use of a large number of thermopiles introduces undesirable conduction effects in the windings required. This desirable feature in accordance with one important aspect of the present invention, involves the incorporation of two thin electrically insulated and highly conducting sheets of metal contiguous to and in the planes of a series of hot and cold junctions. The presence of these plates termed heat flow diffusers, automatically uniformly distributes nonuniform heat flux over the whole heat meter area thereby assuring a correct heat flux average.

Another aspect of the present invention involves plating of high melting point metal such as nickel, iron, or molybdenum on platinum wire previously wound on a ceramic core for accurate measurements or determinations at high temperatures.

Another feature of the present invention involves constructional details resulting in a more rugged device capable of producing accurate and reproducible measurements.

Another feature of the present invention involves the provision and use of a high thermal conductivity compound composed of pure copper dust in a carrier such as, for example, a grease mixed in such proportions that a thick paste results for application between the heat flow transducer and a rough surface to reduce the contact or interface thermal resistance to thereby again assure the production of accurate and reproducible determinations or measurements.

It is therefore a general object of the present invention to provide means and techniques of the character indicated above.

A specific object of the present invention is to provide an improved heat flow transducer or meter.

Another specific object of the present invention is to provide new constructional features which result in a rugged instrument capable of accurate and reproducible determinations particularly at high temperatures.

Another specific object of the present invention is to provide a new high thermal conductivity compound for coupling, in a heat transfer sense, the improved transducer or meter to irregular surfaces in such a manner as to assure the obtainance of accurate and reproducible results.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a plan view of a transducer embodying features of the present invention:

FIG. 2 is a sectional view taken substantially as indicated by the lines 2—2 in FIG. 1, and additionally illustrates the novel thermal conductivity compound interposed between the device of FIG. 1, and an irregular surface for assuring the obtainance of accurate and reproducible results;

FIG. 3 is a perspective view of some of the elements of the device shown in FIGS. 1 and 2.

Figure 4:
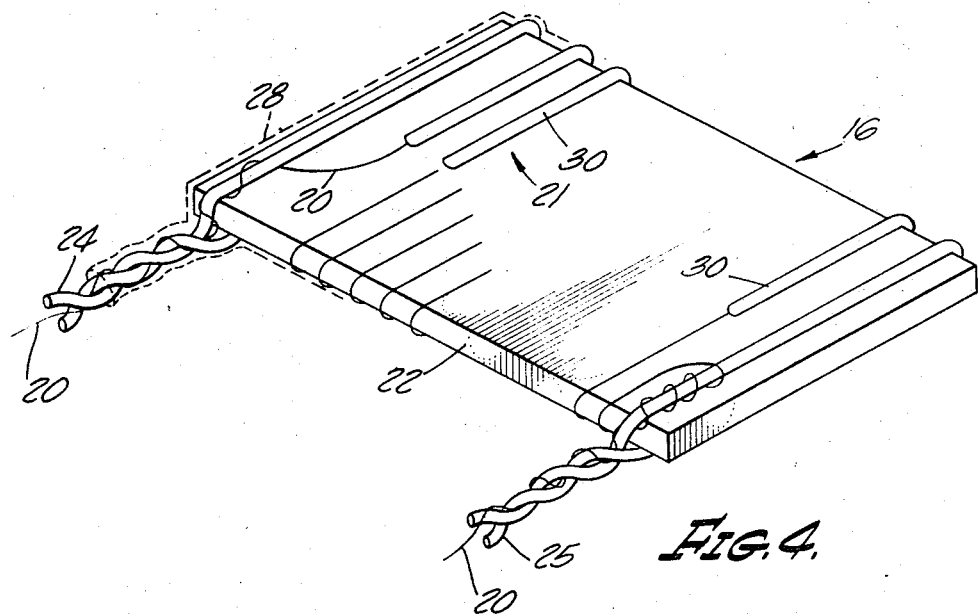
FIGS. 4 and 5 are perspective views illustrating constructional features incorporated in devices embodying features of the present invention.
Figure 5:
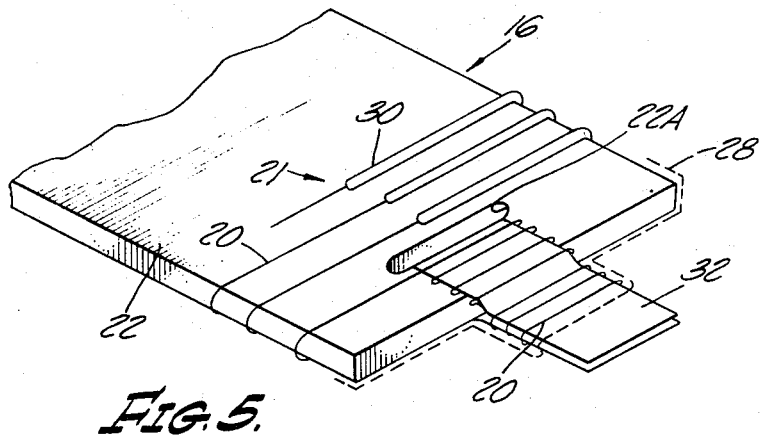

The meter illustrated includes a pair of identical, rectangular coplanar cover plates 10 and 11 of plastic or ceramic material; a pair of identical, rectangular, coplanar, thin copper sheets 12 and 13; a pair of identical, rectangular, coplanar sheets 14 and 15 of plastic or ceramic material; three identical, rectangular, coplanar alumina cores 16 of the character illustrated in either FIG. 4 or FIG. 5 upon which is mounted a corresponding thermopile 21; each of these three cores 16, upon which a corresponding thermopile is mounted, being mounted in a corresponding window portion 18A, 18B, 18C of a ceramic or plastic frame member 18.

As previously indicated, the thermopile may be constructed as shown either in FIGS. 4 or 5. In FIG. 4, platinum wire 20 is wound around the rectangular alumina core 22 and the ends of the platinum wire are each wound around a corresponding platinum lead 24, 25 of heavier gauge, each of these platinum leads 24, 25 being in the form of a wire which circumscribes a corresponding end of the core 16 and with ends of such wire being twisted together as illustrated so as to retain a corresponding end of the platinum wire 20 between twisted end portions of the platinum lead. Each of the platinum leads 24, 25 is covered with a glass glaze 28 bonded to the alumina core 22. The platinum wire 20 is plated with a high melting point metal 30, such as nickel, iron, or molybdenum along only a portion of each of its convolutions to thereby provide a series of hot junctions on one side of the rectangular core and a corresponding series of cold junctions on the other side of the core 22. The platinum lead and platinum wires so plated as described above, is coated with the glaze 28 using glass frits which has a thermal expansion coefficient compatible with that of the alumina core 22.

FIG. 5 illustrates another construction of rigid terminals for the thermopile. In this case, instead of twisting platinum wires of relatively large gauge together as in FIG. 4, the alumina core 22 in FIG. 5 is apertured at each of its ends to provide an apertured portion 22A at each end and a platinum strip 32 extends through each of the apertured portions and is bent as in FIG. 5 in a generally U-shaped configuration. Ends of the platinum wire 20 are each wound around the bent platinum lead 32; and after a portion of each convolution of the platinum wire 20 is plated with a high melting point metal 30 such as nickel, iron or molybdenum also as in FIG. 4 the entire assembly is coated with a glaze 28 so as to leave exposed only a portion of the platinum terminal or lug 32 for electrical connection to a like thermopile in a different one of the apertured portions 18A, 18B, 18C of the frame member 18.

The device so constructed is particularly useful in measuring heat flow from a wall represented as W in FIG. 2, such wall being illustrated as having irregular surfaces, the irregularities in such surfaces being exaggerated to illustrate the purpose of the paste which is interposed between the wall W and the device 9 for providing a good heat transfer coupling between the wall and the device.

This paste comprises pure copper dust of very, very fine mesh, about 0.001 inch in diameter, with the particles of such dust being held in a grease such as is usually used in the lubrication of laboratory glass stop cocks. This mixture of copper dust and grease is such that a thick paste results. The weight of grease to copper is approximately in the following ratio, 1 to 20. Using this compound composed of copper dust and grease between the heat flow transducer 9 and the rough surfaces, the contact or interface thermal resistance is reduced. Sufficient copper dust is suspended uniformly throughout its carrier which may be grease or other like substance for good compliance with adjacent walls between which the mixture of copper dust and carrier is sandwiched so as to produce a conductivity of approximately 5 B.t.u./hr. ft. ° F. which is high enough for most practical purposes and requirements.

The three thermopiles may be connected in a series circuit as illustrated in FIG. 1 with the thermocouple potentiometer or milli-voltmeter 40 which conveniently may have a range of about 50 millivolts and which corresponds to a rate of heat transfer through the meter of about 700 B.t.u./hr. ft.$^2$.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A thermopile structure including a generally rectangular plate of alumina; a plurality of turns of platinum wire wound about said alumina plate, each of said turns being electroplated with a nickel plating over a portion of its length extending from one side of said alumina plate to the other side thereof so as to form a thermopile having a series of thermocouples lying on each side of said alumina plate; a pair of metallic terminals secured to said alumina plate and about which a corresponding end of said wire is wound; a vitreous glaze covering said wires, nickel plating and at least a portion of said terminals.

2. In a heat flow meter of the character described including a central plate of insulating material formed with an apertured portion extending therethrough; a thermopile structure disposed within the confines of said apertured portion; and electrical insulating cover plate sealed to and over each side of said central plate so as to cover the ends of said apertured portion and to form an integral structure with said central plate; a heat conducting metal cover plate sealed to and over a corresponding one of said insulating cover plates so as to form an integral structure with said corresponding cover plates; an electrically insulating cover plate sealed to and over each side of a corresponding heat conducting plate so as to form an integral structure therewith, said thermopile structure including: a generally rectangular ceramic plate; a plurality of turns of platinum wire wound around said ceramic plate; each of said turns being coated with nickel, iron, or molybdenum coating over a portion of its length extending from one side of said ceramic plate to the other side thereof so as to form a thermopile having a series of thermocouples lying on each side of said ceramic plate; a pair of metallic terminals secured to said ceramic plate and about which a corresponding end of said wire is wound; a vitreous glaze covering said wires, coating and at least a portion of said terminals; and leads connected to said terminals and extending from said metal.

3. In a heat flow meter of the character described including a central plate of insulating material formed with an apertured portion extending therethrough; a thermopile structure disposed within the confines of said apertured portion; an electrical insulating cover plate sealed to and over each side of said central plate so as to cover the ends of said apertured portion and to form an integral structure with said central plate; said thermopile structure including: a generally rectangular ceramic plate; a plurality of turns of platinum wire wound around said ceramic plate; each of said turns being coated with nickel, iron, or molybdenum coating over a portion of its length extending from one side of said ceramic plate to the other side thereof so as to form a thermopile having a series of thermocouples lying on each side of said ceramic plate; a pair of metallic terminals secured to said ceramic plate and about which a corresponding end of said wire is wound; a vitreous glaze covering said wires, coating and at least a portion of said terminals; and leads connected to said terminals and extending from said metal.

References Cited

UNITED STATES PATENTS

| 1,528,383 | 3/1925 | Schmidt | 136—226 |
| 2,221,633 | 11/1940 | Dasher | 73—340 |
| 2,493,651 | 1/1950 | Boelter et al. | 136—226 |
| 2,666,089 | 1/1954 | Grier et al. | 136—226 X |

(Other references on following page)

| | | | |
|---|---|---|---|
| 2,768,424 | 10/1956 | Andrus | 136—232 X |
| 2,843,647 | 7/1958 | Anderson et al. | 136—233 X |
| 3,055,965 | 9/1962 | Te Velde | 136—226 X |
| 3,279,239 | 10/1966 | Arends et al. | 73—15 |
| 3,332,807 | 7/1967 | Boehmer et al. | 136—221 X |
| 3,339,002 | 8/1967 | Pelanne | 136—224 X |

FOREIGN PATENTS

| | | |
|---|---|---|
| 19,758 | 9/1904 | Great Britain. |
| 587,996 | 5/1947 | Great Britain. |

OTHER REFERENCES

Huebscher et al. "Transactions of American Society of Heating and Ventilating Engineers," vol. 58, 1952. pp. 275–285.

WINSTON A. DOUGLAS, Primary Examiner

A. BEKELMAN, Assistant Examiner

U.S. Cl. X.R.

73—340; 136—229